United States Patent

[11] 3,622,977

| [72] | Inventors | Hisato Wakamatsu;<br>Noriyoshi Ando, both of Kariya-shi, Japan |
|---|---|---|
| [21] | Appl. No. | 765,902 |
| [22] | Filed | Oct. 8, 1968 |
| [45] | Patented | Nov. 23, 1971 |
| [32] | Priority | Mar. 30, 1968 |
| [33] | | Japan |
| [31] | | 43/21122 |

[54] SLIP WARNING SYSTEM FOR AUTOMOTIVE VEHICLES
8 Claims, 1 Drawing Fig.

[52] U.S. Cl. .................................................. 340/62,
303/21 CG, 244/111, 340/52, 180/105
[51] Int. Cl. .................................................. B60t 8/08
[50] Field of Search ........................................ 340/52, 53,
54, 62; 303/21; 244/111

[56] References Cited
UNITED STATES PATENTS

| 2,980,369 | 4/1961 | Ruof | 244/11 |
|---|---|---|---|
| 3,017,145 | 1/1962 | Yarber | 244/11 |
| 3,245,213 | 4/1966 | Thompson et al. | 303/21 |
| 3,394,967 | 7/1968 | Lucien | 303/21 |
| 3,398,995 | 8/1968 | Martin | 303/21 |
| 3,245,727 | 4/1966 | Anderson et al. | 303/21 |
| 3,499,689 | 3/1970 | Carp et al. | 303/21 |
| 3,507,544 | 4/1970 | Wakamatsu et al. | 303/21 |

Primary Examiner—John W. Caldwell
Assistant Examiner—Robert J. Mooney
Attorney—Cushman, Darby & Cushman ABSTRACT: A slip warning system adapted for use in automotive vehicles, which is operative in such a manner that when the angular deceleration of a wheel has reached a set value, an alarm is sounded and at the same time the set value is raised and the alarm is continuously sounded when the wheel has stopped rotating after the angular deceleration of the wheel has reached said set value, and when the wheel has started rotating again upon release of a braking force, the alarm stops sounding.

PATENTED NOV 23 1971 3,622,977
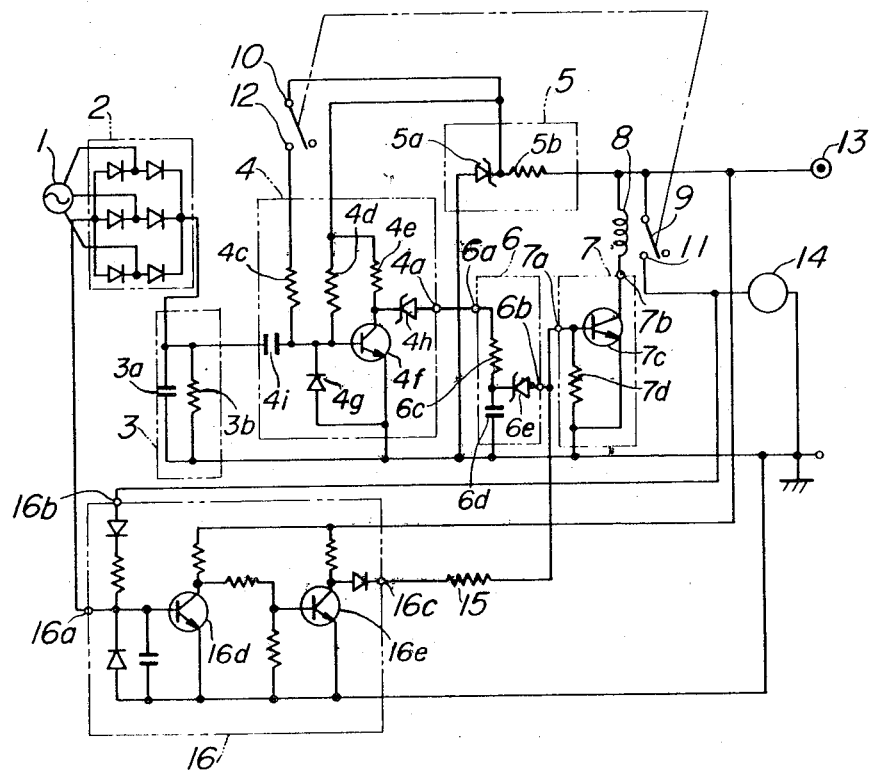
INVENTORS
Hisato Wakamatsu
Noriyoshi Ando
BY Cushman, Darby & Cushman
ATTORNEYS

3,622,977

SLIP WARNING SYSTEM FOR AUTOMOTIVE VEHICLES

BACKGROUND OF THE INVENTION

1. Field of the Invention

The present invention relates to a slip warning system adapted for use in automotive vehicles.

2. Description of the Prior Art

In braking an automotive vehicle to bring it to a halt, it is usual to permit the wheels to slip to such an extent as to prevent binding of the wheels under an excessive braking force, and such an operation has heretofore been effected solely by the intuition and experience of the driver.

However, with only the intuition and experience of the driver, it is almost impossible to completely avoid skidding of the vehicle during the process of stopping the vehicle. The locking of the wheels or the so-called skidding of the wheels, that is, the phenomenon wherein a vehicle slides with the wheels seized, is less likely to occur on the surface of a road, e.g. the dry surface of an asphalt road, which has a large coefficient of friction with respect to the wheels, even when a considerably large operating force is applied to the brake system. However the wheels tend to be readily bound on application of even a slight operating force to the brake system when the vehicle is running on the surface of a road having a small coefficient of friction, such as the wet surface of an asphalt road or a frozen road and such a tendency is more apparent as the running speed of the vehicle becomes higher. Consequently, there is the problem that the danger of serious accidents resulting from an irregular gyration or uncontrollable steering caused by skidding is extremely great.

SUMMARY OF THE INVENTION

The object of the present invention is to provide a slip warning system adapted to be used in automotive vehicles, which comprises a generator for converting the rotating speed of the wheels into direct current voltage, a wheel rotation detecting circuit for detecting whether the wheels are rotating or not, a wheel angular deceleration detecting circuit provided at the output end of said generator for producing an output signal when said direct-current voltage rapidly goes down due to a large angular deceleration of the wheels, and an alarm device which is operated from the output of said wheel angular deceleration detecting circuit and said wheel rotation detecting circuit.

According to the present invention, the driver can adjust a braking force by adjusting the pressure applied to the brake pedal so that the brake force is below a level where the slip warning system intermittently sounds the alarm not only when the vehicle is running on the surface of a road having a large coefficient of friction, such as the surface of a dry concrete-paved road, but also when the vehicle is running on the surface of a road having a small coefficient of friction, such as the wet surface of concrete-paved road or a frozen road, and therefore a driver can brake the vehicle safely at all times even under such a condition where the coefficient of friction between the wheels and the road surface varies largely, without depending on his intuition and experience as he did in the past.

Furthermore, according to the present invention, as the value of an angular deceleration set in the wheel angular deceleration detecting circuit for warning the driver of a growing wheel angular deceleration is changed (in accordance with the actual angular deceleration of the wheel), the duration of the automatic brake force release period can be made shorter (on the average) when the vehicle is running on the surface of a road having a large coefficient of friction (such as on a dry surface of an asphalt road), while it can also be made longer (on the average) when the vehicle is running on the surface of a road having a small coefficient of friction (such as on an icy frozen road). Thus, the vehicle can be prevented from slipping with the wheels locked and the vehicle can be efficiently braked on widely varying road surfaces.

BRIEF DESCRIPTION OF THE DRAWING

The accompanying drawing is an electric connection diagram showing an embodiment of the slip warning system in automotive vehicles according to the present invention.

DESCRIPTION OF THE PREFERRED EMBODIMENT

The present invention will be described with reference to an embodiment shown in the drawing. The rotor of a three-phase AC generator 1 is operatively connected to a wheel (not shown) to be rotated thereby and generates an alternating current voltage in proportion to the rotating speed of the wheel. Reference numeral 2 designates a three-phase full-wave rectifying circuit, 3 a smoothing circuit comprising a smoothing capacitor 3a and a resistor 3b and following after the full-wave rectifying circuit 2, and 4 a wheel angular acceleration detecting circuit for producing an output signal at its output terminal 4a when the angular deceleration of the wheel exceeds a predetermined value which is equivalently set therein. The wheel angular deceleration detecting circuit comprises a capacitor 4i which, in a steady driving state, is fully charged by the AC generator 1 through rectifier 2 and smoothing circuit 3. Capacitor 4i is discharged through diode 4g when the wheel deceleration signal exceeds a certain set value. Transistor 4f has biasing resistors 4c and 4d connected to its base electrode as well as a collector resistor 4e. Transistor 4f is normally conductive due to the biasing current through resistor 4d but it is made nonconductive when its base-emitter circuit is effectively shorted by discharge of capacitor 4i through diode 4g when the wheel is subjected to deceleration exceeding a first value set by biasing resistor 4d. The raised collector voltage due to nonconduction of transistor 4f is passed to the output 4a through Zener diode 4h. Reference numeral 5 designates a constant-voltage circuit which comprises a series resistor 5b for voltage control and a Zener diode 5a for supplying a constant voltage to the wheel angular deceleration detecting circuit 4 even when the voltage of a power source battery (not shown) fluctuates. A delay circuit 6 of which the input terminal and the output terminal are indicated by 6a and 6b respectively comprises an integrating or smoothing circuit constituted by a resistor 6c and a capacitor 6d and a Zener diode 6e which conducts when a voltage across capacitor 6d exceeds a constant value so that a signal voltage is developed at the output terminal 6b a predetermined time after a signal voltage is impressed on the input terminal 6a. Reference numeral 7 designates a switching circuit which is constituted by a transistor 7c and a resistor 7d and 7a and 7b designate the input terminal and the output terminal of said switching circuit 7 respectively. Reference numeral 8 designates a relay coil which is energized when the switching circuit 7 is closed upon impression of the signal voltage on the input terminal 7a thereof. Reference numerals 9, 10 designate movable contacts and 11, 12 fixed contacts cooperating with said movable contacts 9, 10 respectively. The arrangement is such that the cooperating contacts 9, 11 and 10, 12 are closed by the action of the electromagnetic attractive force of the relay coil 8 upon energization of said relay coil, and upon closure of the movable contact 10 and the fixed contact 12, the value of deceleration set in the wheel angular deceleration detecting circuit 4 is changed. Reference numeral 13 designates a terminal through which the system is connected to the positive electrode of a power source battery and 14 an alarm which sounds an alarm when the movable contact 9 and the fixed contact 11 are closed. Reference numeral 15 designates a resistance, 16 designates a wheel rotation detecting circuit comprising two transistors 16d and 16e which alternatively turn conductive and nonconductive, and 16a, 16b and 16c designate the input terminal and the output terminal of said wheel rotation detecting circuit respectively. The resistance 15 is inserted between the output terminal 16c of the wheel rotation detecting circuit 16 and the input terminal 7a of the switching circuit 7. The signal voltage at the input terminal 16a disappears when the wheel stops rotating. When the movable contact 9 and the fixed contact 11 are closed and a power voltage is applied to the input terminal 16b of the wheel rotation detecting circuit 16, and then a signal voltage is developed at the output terminal 16c of said circuit 16. The signal voltage thus developed is impressed on the input terminal 7a of the switching circuit 7 through the resistance 15.

The slip warning system of the invention constructed as described above operates in the following manner: namely, when a brake pedal is actuated to apply a braking force to the wheels for thereby reducing the speed of the vehicle, the peripheral speed of the wheels decreases and eventually the angular deceleration of the wheels exceeds a first value set in the wheel deceleration detecting circuit 4. Thus, a signal voltage is developed at the output terminal 4a of the detecting circuit 4 and impressed on the input terminal 7a of the switching circuit with a predetermined time delay caused by the delay circuit 6. As a result, the switching circuit 7 is closed and at the same time the relay coil 8, connected to the output terminal 7b of said switching circuit, is energized closing the movable contact 9 and the fixed contact 11. Thus, the alarm 14 is energized to sound an alarm. On the other hand, the movable contact 10 and the fixed contact 12 are also closed at the same time when the movable contact 9 and the fixed contact 11 are closed, so that the deceleration value set in the wheel angular deceleration detecting circuit is changed to a second value which is higher than the first value. If, in this case, the angular deceleration of the wheel is lower than the second set value, the relay coil 8 is deenergized again upon passage of a short period of time as determined by the level of the actual angular deceleration, with the result that the movable contact 9 and the fixed contact 11 are opened. Consequently, the current flowing through the alarm 14 is interrupted and the alarm stops sounding. In this case, the movable contact 10 and the fixed contact 12 are also opened, so that the set value in the wheel angular deceleration detecting circuit 4 is again changed to the first set value. The operation described above is repeated until the vehicle is brought to a halt, with the alarm 14 sounding the alarm intermittently. On the contrary, if the angular deceleration of the wheel is higher than the second set value at the time when the set value of the wheel angular deceleration detecting circuit 4 is changed from the first set value to the second set value, the signal voltage is continuously developed at the output terminal 4a of the wheel angular deceleration detecting circuit 4 and therefore the alarm 14 continues to sound. In this case, the driver reduces the braking force being applied to the wheels and thereby the angular deceleration of the wheel is lowered to below the second set value. The alarm 14 sounds intermittently throughout the period when the angular deceleration of the wheel is located between the first set value and the second set value. Now, when the rotation of the wheels is dropped at an angular deceleration greater than a given value and thereafter the wheels have stopped rotating, the movable contact 9 and the fixed contact 11 are closed by virtue of the angular deceleration of the wheel during the process of the braking operation before the wheels stop rotating and the alarm 14 is energized. When the wheels have stopped rotating, the signal voltage at the input terminal 16a of the wheel rotation detecting circuit 16 disappears, so that an output signal voltage is induced at the output terminal 16c by the voltage at the input terminal 16b and this output signal voltage is impressed on the input terminal 7a of the switching circuit 7 through the resistance 15. Thus, the movable contact 9 and the fixed contact 11 are continuously held in their closed positions and the alarm 14 continues to sound. If the driver operates the brake system to decrease the braking force in this case, the wheels start to rotate again and thereby a signal voltage is again developed at the input terminal 16a of the wheel rotation detecting circuit 16. As soon as the wheels start rotating, the movable contact 9 and the fixed contact 11 are opened, so that the alarm 14 stops sounding.

In the operation described above, the duration of sounding the alarm 14 is substantially in proportion to the level of actual angular deceleration of the wheel. This is because of the following reason. Namely, the movable contact 10 and the fixed contact 12 are closed to change the first set value of deceleration to the second set value at a predetermined time after the angular deceleration of the wheel has exceeded the first set value and at that time if the angular deceleration of the wheel is slightly smaller than the second set value, the signal voltage at the output terminal 4a of the deceleration detecting circuit 4 does not disappear at once but continues to exist for a while, though short, even after the first set value has been changed to the second set value. On the other hand, when the angular deceleration of the wheel is slightly greater than the first set value after the first set value has been changed to the second set value, the signal voltage at the output terminal 4a disappears immediately. It will thus be appreciated that the duration of the signal voltage being developed at the output terminal 4a varies in accordance with the intensity of the signal representative of the angular deceleration of the wheel when the first set value has been changed to the second set value.

Next, the system of the invention will be illustrated by way of a practical example thereof. Wheel angular deceleration values of $0.5g$ (20 rad/sec.$^2$) and $1.5g$ (60 rad/sec.$^2$) were set in the wheel angular deceleration detecting circuit as the first and second set values respectively, and the system was arranged such that the alarm 14 would be energized and simultaneously the first set value would be changed to the second value, 100 msec. (0.1 second) after the wheel angular deceleration has reached the first set value. Here, it should be noted that the output voltage of the AC generator 1 corresponding to a vehicle speed of 0.5 m./sec. was taken as a level for detecting the start of wheel rotation (and hence extinguishing the warning), because the actual output voltage of the AC generator 1 is substantially zero at the time wheel rotation just begins. By incorporating the slip warning system arranged as described above in a vehicle, it was possible for the driver to stop the vehicle on a snowy road surface and a frozen road surface at a reasonable braking distance without causing the vehicle to skid, only by applying a braking force to the wheels, which is slightly smaller than the minimum braking force to cause the alarm to sound intermittently.

We claim:

1. A slip warning system for an automotive vehicle, said system comprising:

generating means for converting the rotating speed of a vehicle wheel into a direct current voltage, a wheel angular deceleration detecting circuit connected to said generator means for producing an output signal when said direct current voltage is rapidly reduced due to the angular deceleration of said wheel exceeding a first set value, and an alarm means connected to said deceleration detecting circuit which is actuated by said output signal to warn a driver of said vehicle of the detected excessive wheel slip thereby permitting the driver to adjust an applied brake force and to substantially prevent dangerous levels of wheel slip from occurring, said wheel deceleration detecting circuit including means for changing said set value to a higher second set value upon actuation of said alarm means thereby causing said alarm to be intermittently actuated when the wheel angular deceleration is between said first and second set values.

2. A slip warning system for an automotive vehicle, said system comprising:

generating means for converting the rotating speed of a vehicle wheel into a direct current voltage, a wheel angular deceleration detecting circuit connected to said generator means for producing an output signal when said direct current voltage is rapidly reduced due to the angular deceleration of said wheel exceeding a first set value, an alarm means connected to said deceleration-detecting circuit which is actuated by said output signal to warn a driver of said vehicle of the detected excessive wheel slip thereby permitting the driver to adjust an applied brake force and to substantially prevent dangerous levels of wheel slip from occurring, a time delay circuit connected between said wheel deceleration detecting circuit and said alarm means to provide a predetermined smoothing time delay in transferring said output signal to said alarm means, and wherein said alarm means includes a switching circuit for actuating an alarm device, and said wheel deceleration detecting circuit includes means for changing said set value to a second higher set value upon actuation of said switching circuit.

3. A slip warning system for an automotive vehicle, said system comprising:

generating means for converting the rotating speed of a vehicle wheel into a direct current voltage, a wheel angular deceleration detecting circuit connected to said generator means for producing an output signal when said direct current voltage is rapidly reduced due to the angular deceleration of said wheel exceeding a first set value, and an alarm means connected to said deceleration-detecting circuit which is actuated by said output signal to warn a driver of said vehicle of the detected excessive wheel slip thereby permitting the driver to adjust an applied brake force and to substantially prevent dangerous levels of wheel slip from occurring, said wheel angular deceleration detecting circuit comprising:

a capacitor having one electrode connected to an output terminal of said generator means, a transistor having base, collector and emitter terminals with another electrode of said capacitor connected to said base terminal, a diode having a cathode connected to said another electrode and an anode connected to said emitter terminal, and two biasing resistors connected to said base terminal for equivalently setting two different set values of deceleration such that said output signal is produced for different set values of deceleration depending upon the connection of said biasing resistors to a power source.

4. A slip warning system as in claim 2 further comprising:

a wheel rotation detecting circuit for sensing when said wheel has stopped rotating while said alarm means is actuated and for maintaining said alarm means in an actuated condition until said wheel again begins to rotate.

5. A system for use with an automobile to help prevent undesirable slip or skidding of the vehicle during braking operations on different types of road surfaces, said system comprising:

generating means for converting the rotating speed of a vehicle wheel into a speed signal representing the rotational speed of said wheel, an angular deceleration detecting circuit operatively connected to said generating means for sensing angular deceleration of said wheel from said speed signal and for producing an output signal when said deceleration exceeds a first set value, utilizing means adapted for actuation by said output signal to indicate the need for reducing an applied braking force to prevent said undesirable slip or skidding, and feedback means connected to said detecting circuit for changing said set value to a higher second set value upon actuation of said utilizing means thereby causing the subsequent cessation of said output signal unless the sensed deceleration also exceeds said second set value whereby said utilizing means is repetitively actuated if the sensed deceleration is between said first and second values and continuously actuated if the sensed deceleration is above said second value.

6. A system as in claim 5 further comprising a time delay smoothing circuit connected between said deceleration detecting circuit and said utilizing means.

7. A system as in claim 5 further comprising:

a wheel rotation detecting circuit connected to said generating means for sensing whether the wheel is rotating, said wheel rotation detecting circuit being also connected to said utilizing means for maintaining said utilizing means in an actuated condition if said wheel ceases to rotate after actuating of the utilizing means even if the sensed deceleration of the wheel should fall to zero.

8. A system as in claim 7 wherein:

said utilizing means comprises a warning means for warning a driver such that an adjustment of the applied brake force may be made to just prevent the repetitive actuation of said warning means.

* * * * *

UNITED STATES PATENT OFFICE
CERTIFICATE OF CORRECTION

Patent No. 3,622,977   Dated November 23, 1971

Inventor(s) Hisato Wakamatsu et al

It is certified that error appears in the above-identified patent and that said Letters Patent are hereby corrected as shown below:

Notice of the assignment of the invention was omitted from the heading and should read:

[73]  Assignee:  Nippon Denso Company, Limited
              Kariya-ski, Japan

Signed and sealed this 6th day of June 1972.

(SEAL)
Attest:

EDWARD M. FLETCHER, JR.          ROBERT GOTTSCHALK
Attesting Officer                Commissioner of Patents